United States Patent
Tseng

(10) Patent No.: US 9,647,521 B2
(45) Date of Patent: May 9, 2017

(54) POWER GENERATING DEVICE AND AN OBJECT FOR UTILIZING THE POWER GENERATING DEVICE

(71) Applicant: Shen-Ko Tseng, Taipei (TW)

(72) Inventor: Shen-Ko Tseng, Taipei (TW)

(*) Notice: Subject to any disclaimer, the term of this patent is extended or adjusted under 35 U.S.C. 154(b) by 67 days.

(21) Appl. No.: 14/886,274

(22) Filed: Oct. 19, 2015

(65) Prior Publication Data

US 2016/0111947 A1   Apr. 21, 2016

(30) Foreign Application Priority Data

Oct. 20, 2014 (CN) .......................... 2014 1 0557121

(51) Int. Cl.
*H02K 35/00* (2006.01)
*A43B 3/00* (2006.01)
*F03G 5/06* (2006.01)
*H02K 35/02* (2006.01)
*H02K 7/18* (2006.01)

(52) U.S. Cl.
CPC ........... *H02K 35/00* (2013.01); *A43B 3/0015* (2013.01); *F03G 5/06* (2013.01); *H02K 7/1892* (2013.01); *H02K 35/02* (2013.01)

(58) Field of Classification Search
CPC ...... H02K 35/00; H02K 35/02; H02K 7/1892; A43B 3/0015; F03G 5/06
USPC ....................................................... 290/1 R
See application file for complete search history.

(56) References Cited

U.S. PATENT DOCUMENTS

| 6,376,925 B1* | 4/2002 | Galich | F03G 7/08 290/1 R |
| 6,744,145 B2* | 6/2004 | Chang | A43B 3/0005 219/211 |
| 7,329,959 B2* | 2/2008 | Kim | B81B 3/0024 290/1 R |
| 8,087,186 B2* | 1/2012 | Rastegar | A43B 7/02 290/1 A |
| 8,468,722 B2* | 6/2013 | Battlogg | A43B 5/0405 36/117.1 |
| 2013/0033042 A1* | 2/2013 | Fortier | A43B 3/0015 290/54 |
| 2013/0188341 A1* | 7/2013 | Tseng | H02K 35/04 362/183 |
| 2014/0285296 A1* | 9/2014 | Nagahara | H01F 7/0231 335/302 |

(Continued)

*Primary Examiner* — Viet Nguyen

(57) ABSTRACT

The present invention provides a power generating device, comprising the first shell, the sensor module, the second shell, the magnetic module, the cover and the elastic element. The sensor module is disposed in the first hollow portion. The second shell is disposed on the first shell. The magnetic module is disposed on the first fixture portion of the second shell. The cover is disposed on the external surface of the second shell, and the convex portion penetrates through the hole and holds the magnetic module in the first fixture portion. The elastic element is disposed between the first shell and the second shell. When the power generating device takes the external force, the second shell and the first shell do the relative movement; meanwhile, the first magnetism element of the magnetic module slides through the direction of the external force in the first slide gap and the induced current is generates on the induction coil by the change of the magnetic flux.

20 Claims, 15 Drawing Sheets

(56) References Cited

U.S. PATENT DOCUMENTS

| | | | |
|---|---|---|---|
| 2015/0097374 A1* | 4/2015 | Lin | F03G 5/06 |
| | | | 290/1 R |
| 2015/0279598 A1* | 10/2015 | Matsumoto | H02K 7/1853 |
| | | | 335/205 |
| 2015/0318776 A1* | 11/2015 | Tseng | H02K 35/02 |
| | | | 310/15 |
| 2016/0276961 A1* | 9/2016 | Tseng | H05B 33/0842 |
| 2016/0285393 A1* | 9/2016 | Vincent | H02K 35/00 |

\* cited by examiner

POWER GENERATING DEVICE AND AN OBJECT FOR UTILIZING THE POWER GENERATING DEVICE

BACKGROUND OF THE INVENTION

1. Field of the Invention

The present invention relates to a power generating device, more particularly, to a power generating device using electromagnetic induction to generate power.

2. Description of the Prior Art

In order to comply with the current worldwide trend of energy conservation and environmental protection, many practical and energy-saving products are being sold in the market. Among them, the products that can generate power through simple actions performed by their users not only achieve the goal of energy conservation and environmental protection but also fulfill the needs to be innovative and interesting. The examples of the products that can generate power are the flashlights that can generate power through force generated from a hand and the bicycles that can change mechanical energy to electrical energy.

In another example, when a pedestrian is walking at night where the light in the surrounding area is inadequate, there is a higher probability of traffic accidents. Because of this, pedestrians often need to equip with reflective devices or self-luminous devices to increase their visibility at night. Moreover, because the self-luminous devices need to be carried everywhere, thin-type batteries are usually set inside the devices. However, the thin-type batteries mentioned above usually contain mercury, which easily causes pollution to the environment. Additionally, if the devices do not have the appropriate waterproofing ability, the batteries mentioned above will likely induce the problems such as current leakage, damp or damage.

To summarize the statements mentioned above, if the self-luminous devices can generate power through simple actions performed by their users and the structures inside are simple and do not need high grade waterproofing equipment, the mercury batteries with high pollution will no longer be needed, which becomes more convenient for the pedestrians and also increases the traffic security of the pedestrians. Therefore, a device capable of solving the aforementioned problems has extremely high practicality, which is an urgent problem that every company in the industry eagers to solve.

SUMMARY OF THE INVENTION

An object of the present invention is to provide a power generating device that can generate power through simple actions performed by its users. Therefore, the mercury battery that causes pollution does not need to be set in the devices, and the traffic security of the pedestrian can be increased through the generated LED light source.

According to an embodiment of the present invention, the present invention provides a power generating device comprises a first shell, a sensor module, a second shell, a magnetic module, a cover and an elastic element. The first shell has a first hollow portion and a first opening portion; the sensor module is configured in the first hollow portion of the first shell, the sensor module comprises a magnetism element and an induction coil coiled on the magnetism element, the magnetism element comprises a first terminal and a second terminal, the first slide gap is formed between the first terminal and second terminal; the second shell has a second hollow portion and a second opening portion, the first shell is configured in the second hollow portion by the second shell through the second opening portion, the second shell has a first fixture portion and a hole, the first fixture portion is formed on the internal surface of the second shell and has a first vertical tank, the hole is connected with the first vertical tank by penetrating through the internal surface and an external surface of the second shell; the magnetic module comprising a first magnetism element is configured in the first vertical tank of the first fixture portion; the cover is disposed on the external surface of the second shell, the cover comprises a convex portion, the magnetic module is held in the first fixture portion through penetrating the hole by the convex portion; and the elastic element is disposed on the external surface of the second shell, the cover comprises a convex portion, the magnetic module is held in the first fixture portion through penetrating the hole by the convex portion.

Wherein when an external force is applied to the power generating device for allowing the second shell and first shell to generate the relative movement, the first magnetism element of the magnetic module slides through the direction of the external force in the first slide gap for allowing the induction coil to induct a change in magnetic flux to generate induced current; meanwhile, the elastic element is compressed with respect to the external force and a restoring force of the elastic element is applied to the first shell and the second shell when the external force is vanished, wherein the direction of the restoring force and the external force is opposite.

Based on the design mentioned above, the magnetism element selectively comprises a first sensor arm and a second sensor arm. The first sensor arm comprises a first connecting portion, a first terminal and a first wrapping portion, the first connecting portion is connected with the first terminal through the first wrapping portion. The second sensor arm comprises a second connecting portion, a second terminal and a second wrapping portion, the second connecting portion connected with the second terminal through the second wrapping portion, and the second connecting portion is connected with the first connecting portion.

Based on the design mentioned above, the first sensor arm selectively comprises a first extension section, the first extension section is formed by extending outwardly from the first terminal with respect to the other direction of the first connecting portion, the second sensor arm further comprises a second extension section, the second extension section is formed by extending outwardly from the second terminal with respect to the other direction of the second connecting portion, and a second slide gap is formed between the first extension section and the second extension section for the first fixture portion of the second shell to move through the direction of the external force.

Based on the design mentioned above, the first wrapping portion and the second wrapping portion of the sensor module are L-shaped respectively, and the first wrapping portion and the second wrapping portion are U-shaped respectively when the first connecting portion is connected with the second connecting portion.

Based on the design mentioned above, the second shell selectively comprises a second wall portion and a supporting part, the first fixture portion is connected with the second wall portion through supporting part, the first shell further comprises a slot, wherein when the external force is applied to the power generating device, the second shell and the first shell generate the relative movement, and the supporting part is moved into the slot for the relative movement.

Based on the design mentioned above, the second shell further comprises a second fixture portion, the second fixture portion is configured on the internal surface of the second shell, the second fixture portion is connected with the first fixture portion through the hole, the second fixture portion comprises a second vertical tank, and two ends of the first magnetism element of the magnetic module are configured in the first vertical tank and the second vertical tank respectively.

Based on the design mentioned above, the first shell selectively comprises a positioning structure, the positioning structure is formed on the internal surface of the first shell, the positioning structure comprises a first conductor, the second fixture portion comprises a second conductor, wherein when the external force is applied to the power generating device, the second shell and the first shell generate a relative movement, and the first conductor is moved into the second conductor for the relative movement.

Based on the design mentioned above, the magnetic module selectively comprises a second magnetism element, configured in the first vertical tank of the first fixture portion and connected with the first magnetism element, the polarity of the first magnetism element and the second magnetism element corresponding to the lateral surface of the first terminal is different.

Based on the design mentioned above, the first shell comprises a first wing portion, the first wing portion is formed by extending from the first shell through the direction of the normal vector of the external surface of the first opening portion, the second shell comprises a second wing portion, the second wing portion is formed by extending from the second shell through the direction of the normal vector of the internal surface of the first opening portion, and the first wing portion and the second wing portion are buckled with each other for avoiding the first shell and second shell to be broken away.

Based on the design mentioned above, the first shell further comprises a location pillar, the location pillar comprises a location hole, the elastic element is configured in the location hole, the second shell further comprises a second convex pillar, the location of the second convex pillar is corresponding to the location hole, and the second convex pillar is penetrated and set into the elastic element, when the external force is applied to the elastic element, the thickness of the second convex pillar is small than the thickness of the elastic element.

According to an embodiment of the present invention, the present invention provides a power generating device comprising a first shell, a sensor module, a second shell, a magnetic module, a cover and an elastic element. The first shell comprises a first hollow portion and a first opening portion. The sensor module is configured in the first hollow portion of the first shell, wherein the sensor module comprises a magnetism element and an induction coil coiled on the magnetism element, wherein the magnetism element comprises a first terminal and a second terminal, and a first slide gap is formed between the first terminal and the second terminal, wherein the magnetism element comprises at least two elements, the second shell has a second hollow portion and a second opening portion for the first shell being disposed in the second hollow portion, the second shell has a first fixture portion and a hole, the first fixture portion has a first vertical tank formed on the internal surface of the second shell, the hole is connected with the first vertical tank by penetrating through the internal surface and an external surface of the second shell. The magnetic module comprising a first magnetism element is configured in the first vertical tank of the first fixture portion. The cover is disposed on the external surface of the second shell, the cover comprises a convex portion, and the magnetic module is held in the first fixture portion through penetrating the hole by the convex portion. The elastic element is disposed between the first shell and the second shell.

Wherein when an external force is applied to the power generating device for allowing the second shell and first shell to generate the relative movement, the first magnetism element of the magnetic module slides through the direction of the external force in the first slide gap for allowing the induction coil to induct a change in magnetic flux to generate induced current; meanwhile, the elastic element is compressed with respect to the external force and a restoring force of the elastic element is applied to the first shell and the second shell when the external force is vanished, wherein the direction of the restoring force and the external force is opposite.

Based on the design mentioned above, the magnetism element selectively comprises a first sensor arm and a second sensor arm. The first sensor arm comprises a first connecting portion, a first terminal and a first wrapping portion, the first connecting portion connected with the first terminal through the first wrapping portion. The second sensor arm comprises a second connecting portion, a second terminal and a second wrapping portion, the second connecting portion connected with the second terminal through the second wrapping portion, and the second connecting portion connected with the first connecting portion.

Based on the design mentioned above, the magnetism element selectively comprises a first sensor arm, a second sensor arm and an engaging element. The first sensor arm comprises a first connecting portion, a first wrapping portion and a first terminal, and the first connecting portion is connected with the first terminal through the first wrapping portion. The second sensor arm comprises a second connecting portion, a second wrapping portion and a second terminal; the second connecting portion is connected with the second terminal through the second wrapping portion. The engaging element is disposed on the surface of the first connecting portion relative to the second connecting portion and the surface of the second connecting portion relative to the first connecting portion to hold the first connecting portion and the second connecting portion.

Based on the design mentioned above, the magnetism element selectively comprises a wrapping element, a first terminal and a second terminal. The wrapping element comprises a first wrapping portion, a second wrapping portion, a first connecting portion and a second connecting portion. The first wrapping portion, the second wrapping portion, the first connecting portion and the second connecting portion are one-piece formed. The first terminal is disposed on the other end of the first wrapping portion corresponding to the first connecting portion. The second terminal is disposed on the other end of the second wrapping portion corresponding to the second connecting portion.

Based on the design mentioned above, the first terminal selectively comprises a third connecting portion, and the first wrapping portion selectively comprises a fourth connecting portion, wherein the first terminal is coupled with the fourth connecting portion of the first wrapping portion through the third connecting portion. The second terminal selectively comprises a fifth connecting portion, and the second wrapping portion selectively comprises a sixth connecting portion, wherein the second terminal is coupled with the sixth connecting portion of the second wrapping portion through the fifth connecting portion.

To summarize the statements mentioned above, the power generating device of the present invention can be used in shoe pads or ground pads. When a user walks or activates the power generating device through an external force, the power generating device will use electromagnetic induction to generate an induced current, to which the induced current can be stored to supply power to the light emitting diodes in order to emit light. It should also be noted that any appropriate electronic device that is one-piece formed in the power generating device of the present invention has the potential to become a green product, as it does not need to connect to any type of outside power source or batteries. Therefore, the power generating device of the present invention can be easily installed in shoes to generate power automatically when a user performs an action such as walking. More particularly, the lighting module of the power generating device of the present invention can increase the visibility at night, which also increases the traffic security of the pedestrian.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein:

FIG. 1A to FIG. 1D individually show a top view stereogram, a bottom view stereogram, a bottom view diagram, and a side view diagram of the power generating device in an embodiment of the present invention.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1A:
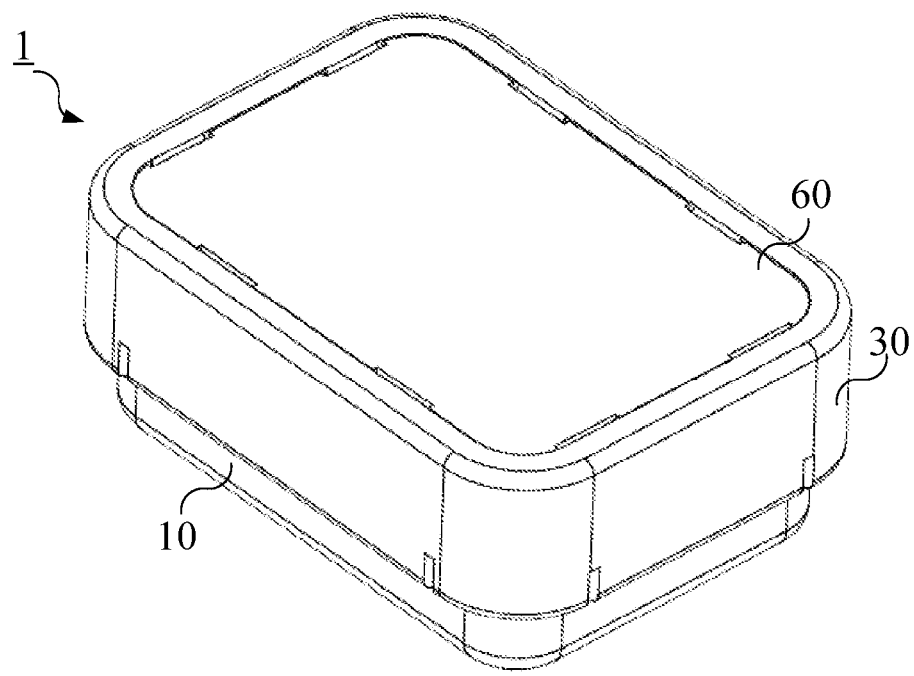
Figure 1B:
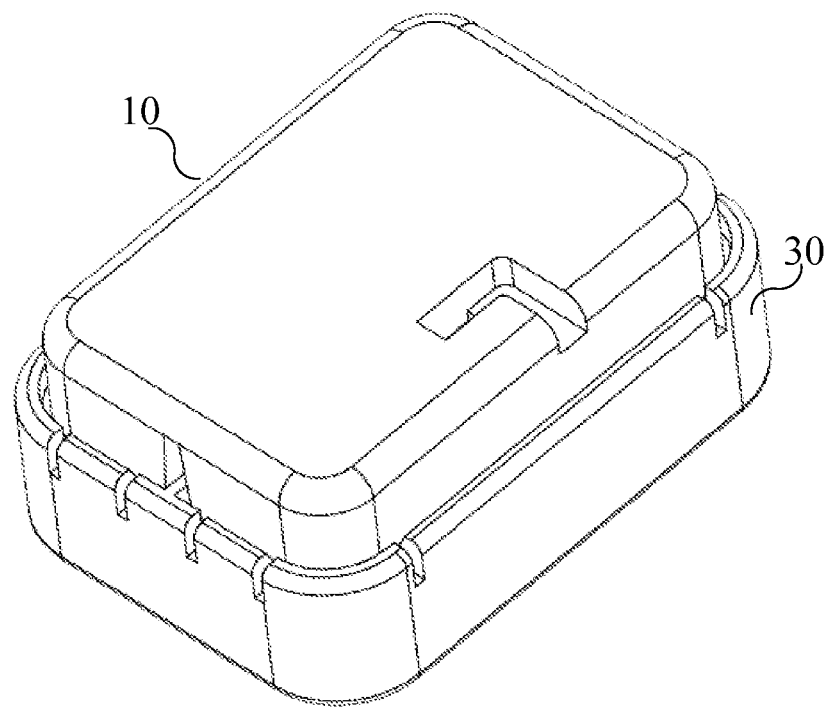
Figure 1C:
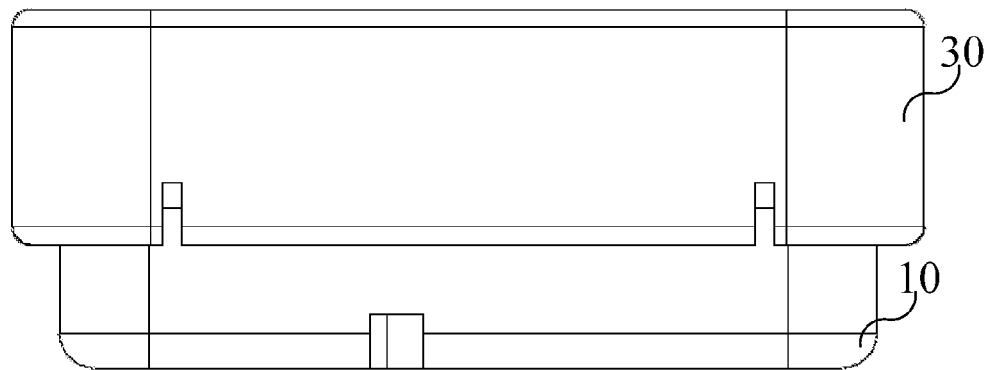
Figure 1D:
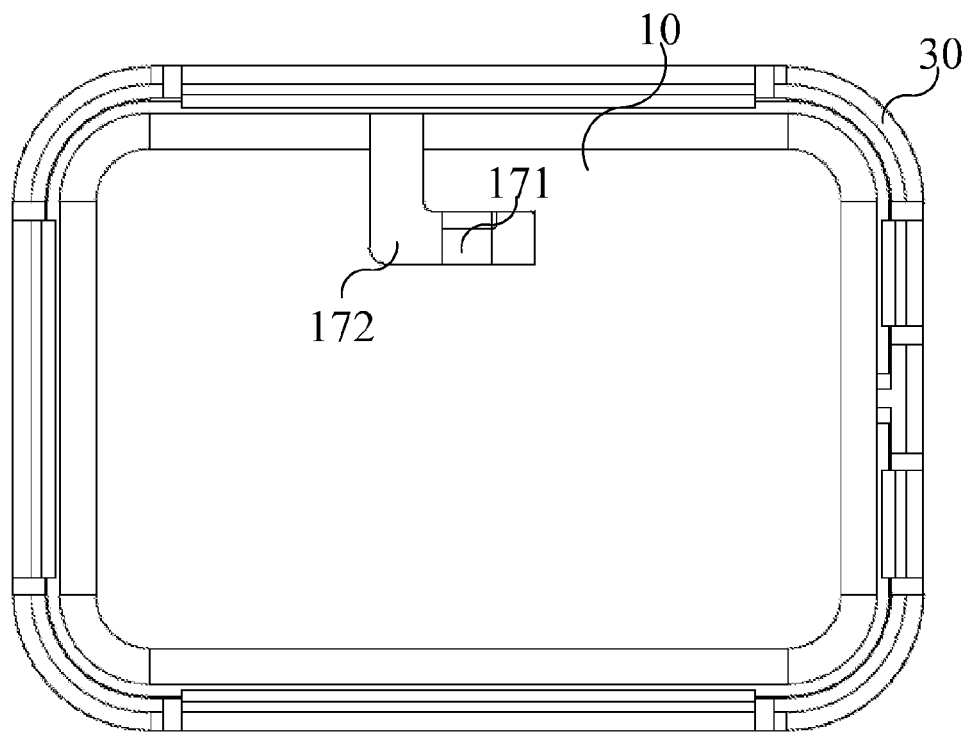
Figure 2A:
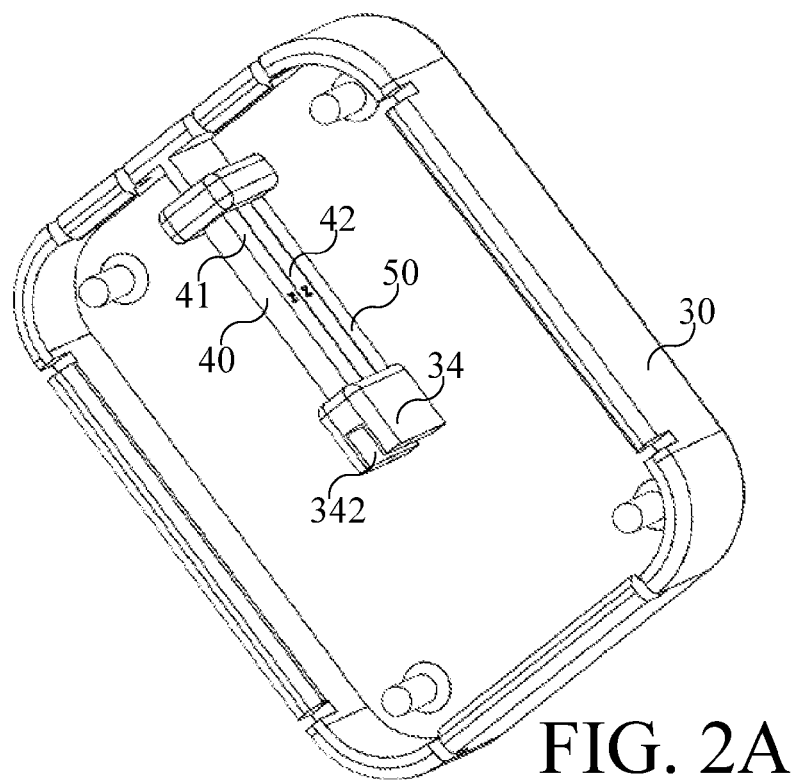
FIG. 2A shows a stereogram of the power generating device comprising the second shell, the first magnetism element, the second magnetism element and the cover in an embodiment of the present invention
Figure 2B:
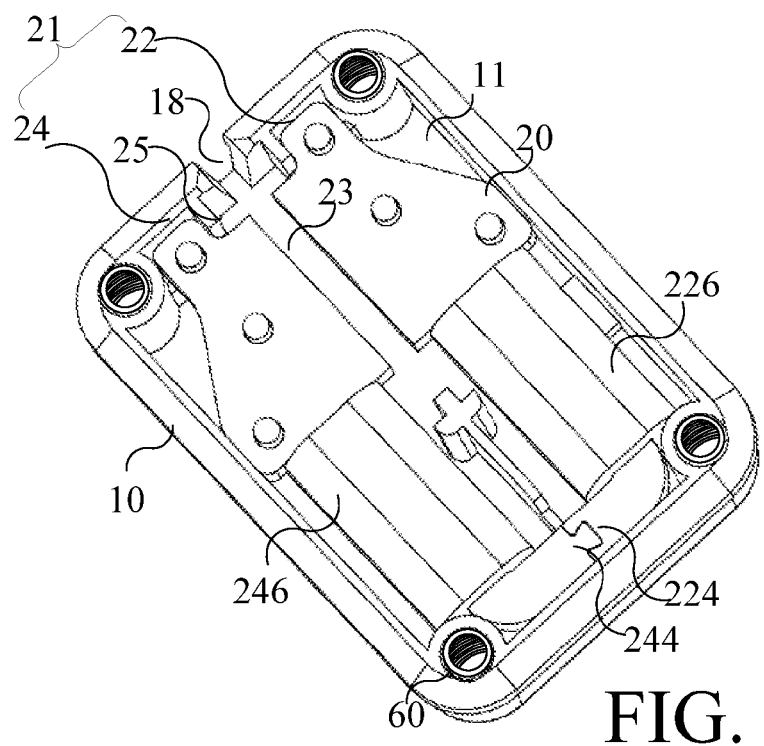
FIG. 2B shows a stereogram of the power generating device comprising a first shell, a sensor module and an elastic element in an embodiment of the present invention.

Please refer to FIG. 1A to FIG. 1D and FIG. 2A to FIG. 2B, FIG. 1A to FIG. 1D individually shows a top view stereogram, a bottom view stereogram, a bottom view diagram, and a side view diagram of the power generating device in an embodiment of the present invention, FIG. 2A shows a stereogram of the power generating device comprising the second shell, the first magnetism element, the second magnetism element and the cover in an embodiment of the present invention, FIG. 2B shows a stereogram of the power generating device comprising the first shell, the sensor module and the elastic element in an embodiment of the present invention. It is worth noting that the appended drawings of the present invention are drawn according to a real life scale.

According to the figures shown above, in this embodiment, a power generating device 1 comprises a first shell 10, a sensor module 20, a second shell 30, a magnetic module 40, a cover 50 and an elastic element 60.

The first shell 10 comprises a first hollow portion and a first opening portion, the sensor module 20 is disposed on the first hollow portion, the second shell 30 is disposed on the first opening portion for the first hollow portion not to be contacted with the outside, the cover 50 is disposed on the external surface of the second shell to hold the magnetic module 40 in the second shell 20, and the elastic element 60 is configured between the first shell 10 and the second shell 30 to provide a restoring force.

Figure 15:
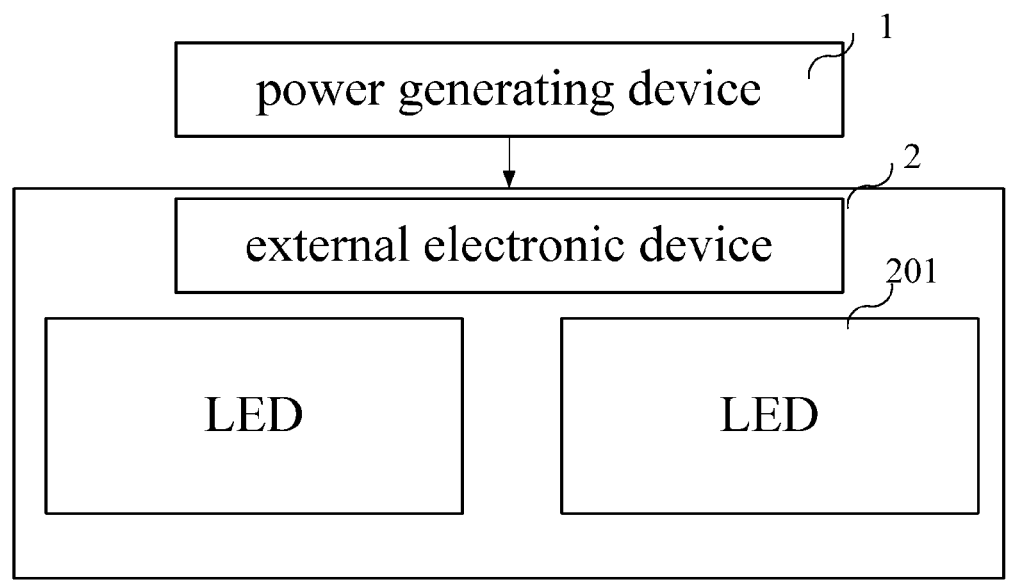
FIG. 15 shows the functional diagram of the external electronic device of the power generating device in an embodiment of the present invention.

In practical application, the power generating device 1 of the present invention can be used in shoe pads or ground pads. When a user walks, an external force is applied to the power generating device 1 directly or indirectly. When the external force is applied to the power generating device 1 for allowing the cover 50 disposed on the second shell 30, the second shell 30 and the first shell 10 to generate the relative movement, and the magnetic module 40 and the sensor module 20 generate the relative movement, the induction coil of the sensor module 20 inducts a change in magnetic flux to generate induced current for the external electronic device 2, like the LED 201, coupled with the power generating device 1. The embodiment showed in the FIG. 15 is one of the examples. FIG. 15 shows the functional diagram of the external electronic device of the power generating device in an embodiment of the present invention. Meanwhile, when the external force is applied to the first shell 10 or the second shell 30, the elastic element 60 between the first shell 10 and the second shell 30 is compressed with respect to the external force and a restoring force of the elastic element 60 is applied to the first shell 10 and the second shell 30 to help the first shell 10 and the second shell 30 back to the original position when the external force is vanished.

Figure 3A:
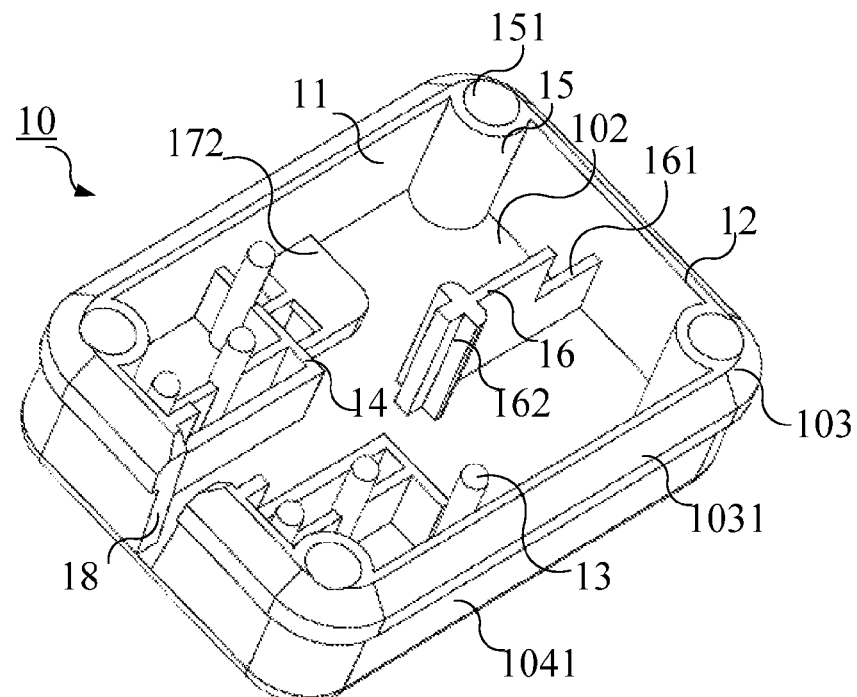
FIG. 3A to FIG. 3B show the top view stereogram of the first shell of the power generating device in an embodiment of the present invention.
Figure 3B:
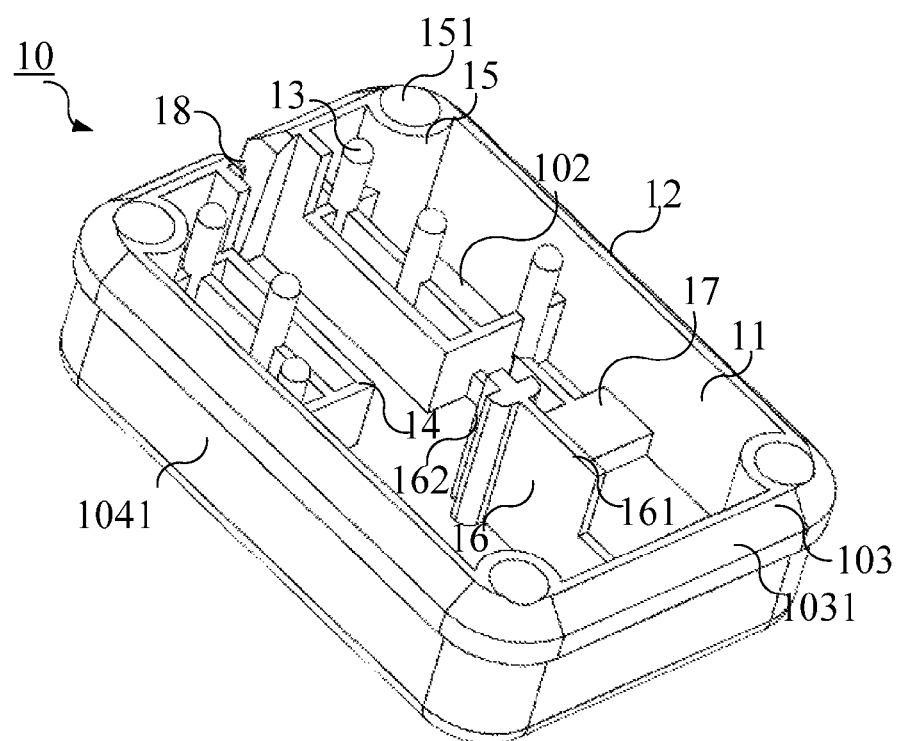
Figure 3C:
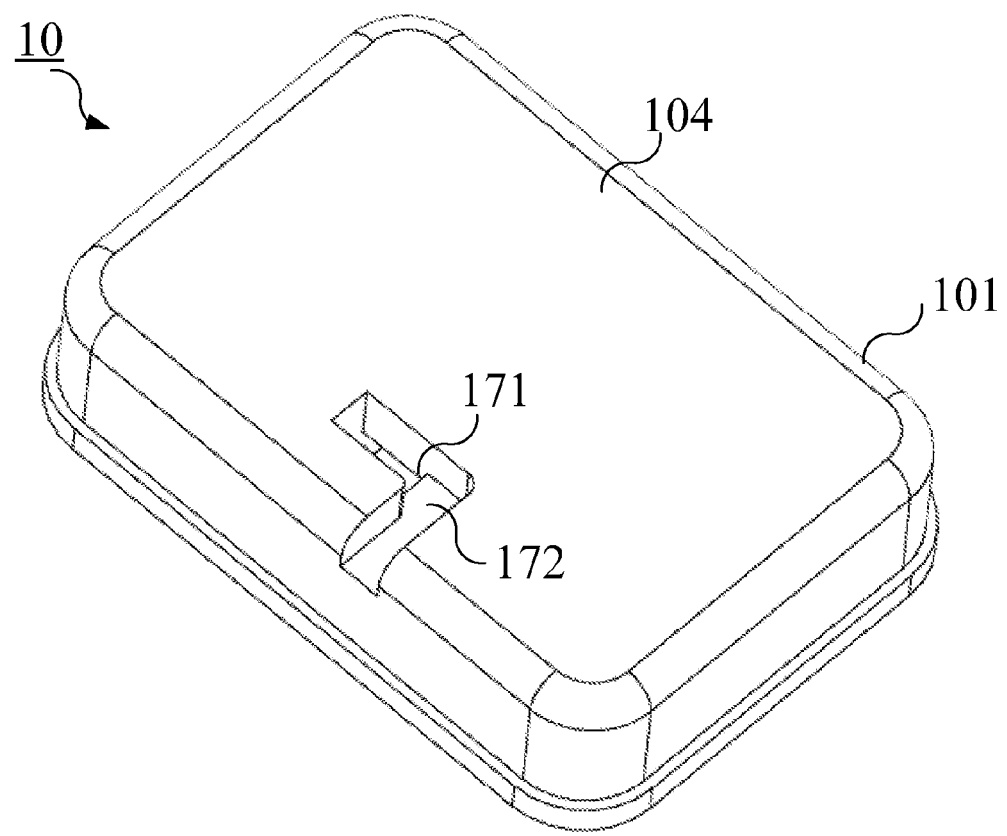
FIG. 3C shows the bottom view diagram of the first shell of the power generating device in an embodiment of the present invention.

Before further illustrating the structure of the present invention, the following statement will illustrate the design of every element first. Please refer to the FIG. 2A to FIG. 2B and FIG. 3A to FIG. 3C, FIG. 3A to FIG. 3B shows the top view stereogram of the first shell of the power generating device in an embodiment of the present invention FIG. 3C shows the bottom view diagram of the first shell of the power generating device in an embodiment of the present invention In the embodiment, the first shell 10 of the present invention is square bowl structure, and the first shell 10 has the external surface 101 and the internal surface 102. The first shell 10 has a first base portion 104 and a first wall portion 1041. The first wall portion 1041 is formed by extending from the internal surface of the first base portion 104 through the direction of the normal vector of the internal surface of the first base portion 104, the first wall portion 1041 comprises a first hollow portion 11, and the first opening portion 12 is disposed on the other end of the first hollow portion 11 corresponding to the first base portion 104. Meanwhile, the side margin 103 is disposed on the other side of the first wall portion 1041 corresponding to the first base portion 104, and the first opening portion 12 is surrounded by the side margin 103.

Additionally, the first shell 10 comprises a first convex pillar 13, a plummer 14, a location pillar 15 and a positioning structure 16 disposed in the first hollow portion 11 and extending from the first shell 10 through the direction of the normal vector of the internal surface 102 of the first base portion 104.

The first convex pillar 13 penetrates through the sensor module to hold the sensor module 20, and the plummer 14 loads the sensor module 20 to hold the first hollow portion 11 at the assigned height.

Otherwise, in the embodiment, the first shell 10 comprises a plurality of location pillars 15 disposed on the four corners of the first shell 10 separately. The internal of the location pillar 15 comprises a location hole 151 for the elastic element 60, showed in FIG. 2B, to be disposed in it. In the embodiment, the elastic element is a spring but not limited to the spring, and the elastic element also can be some other elements providing restoring force like an air buffer device.

Moreover, the internal of the first shell 10 also comprises a positioning structure 16 formed on the internal surface 102 of the first shell 10. The one of the sides of the positioning structure 16 is connected with the internal surface of the first base portion 104 and the first wall portion 1041. More particularly, the positioning structure 16 comprises a stepped portion 161 and a first conductor 162. The first conductor 162 is disposed on the central of the first shell 10 and connected with the first wall portion 1041 through the stepped portion 161. The first conductor 162 comprising a tenon-shaped structure cooperates with a second conductor 342 of a second fixture portion 34 of the second shell 30 to make the second conductor 342 of the second fixture portion 34 slide through the tenon-shaped structure of the first conductor 162. Otherwise, the height of the joint of the stepped portion 161 and the joint of the first conductor 162 is about the same, the step-shaped structure showed by pouch of the stepped portion 161 close to the first wall portion 1041, and the pouch loads the sensor module 20 and holds the first hollow portion 11 at the assigned height.

Moreover, the first shell 10 further comprises a slot 18 formed on the first wall portion 1041 corresponding to the another side of the stepped portion 161 mentioned above for a supporting part 35 of the second shell 30 to move into and slide through it.

Besides, the first shell 10 comprises a first wing portion 1031 corresponding to the side margin 103. The first wing portion 1031 is formed by extending from the external surface of the side margin 103 through the direction of the normal vector of the external surface of the side margin 103. The first shell 10 is buckled with the second wing portion 3031 of the second shell 30 through the first wing portion 1031 to avoid the first shell 10 and the second wing portion 3031 of the second shell 30 being broken away. In the embodiment, the upper surface of the first wing portion 1031 has an inclined lead angle to make the second shell 30 buckle with others easily. Besides, the first shell 10 comprises a cable entry 171 and a wire slot 172 connected with the cable entry 171. The cable entry 171 is disposed on the central of the first base portion 104 and penetrates through it; meanwhile, the cable entry 171 is connected with the L-shaped wire slot 172 disposed on the external surface 101, and the electric cable is disposed on the external surface 101 of the first shell 10 through the cable entry 171 and wire slot 172.

Figure 4A:
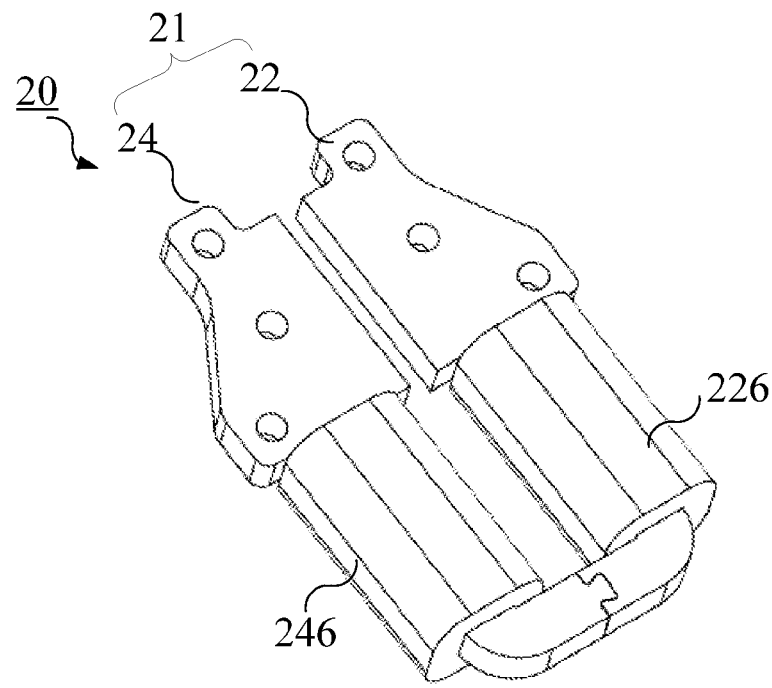
FIG. 4A shows the diagram of the sensor module of the power generating device in an embodiment of the present invention.
Figure 4B:
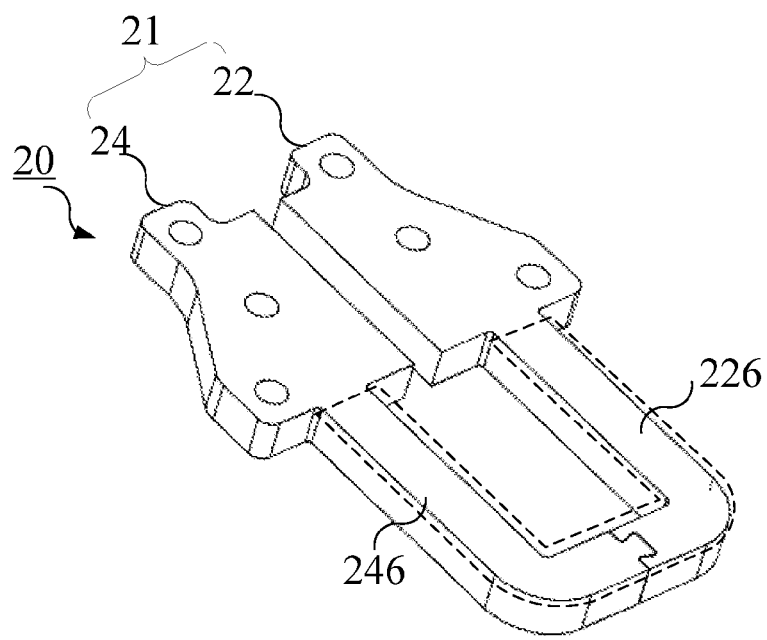
FIG. 4B shows the diagram of the magnetic module of the power generating device in an embodiment of the present invention.
Figure 5A:
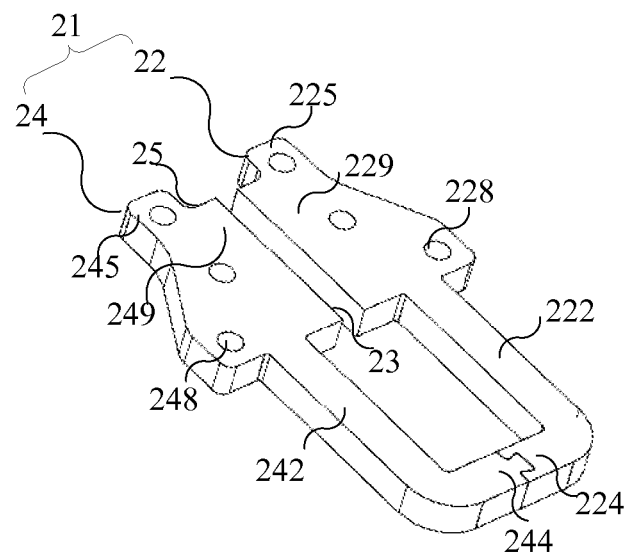
FIG. 5A shows the diagram of the magnetism element of the power generating device in an embodiment of the present invention.
Figure 5B:
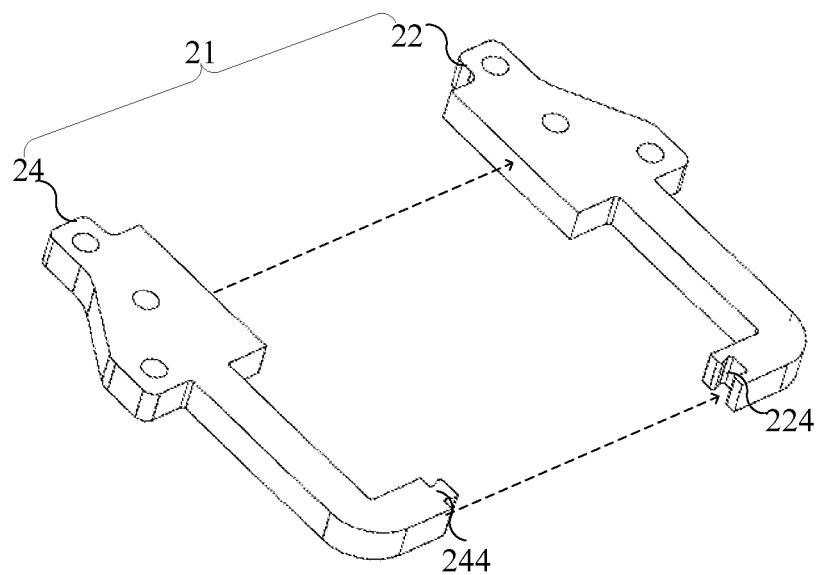
FIG. 5B shows the exploded drawing of the magnetism element of the FIG. 5A of the power generating device in an embodiment of the present invention.

Please refer to the FIG. 4A, FIG. 4B, FIG. 5A and FIG. 5B, FIG. 4A shows the diagram of the sensor module of the power generating device in an embodiment of the present invention, FIG. 4B shows the diagram of the magnetic module of the power generating device in an embodiment of the present invention, FIG. 5A shows the diagram of the magnetism element of the power generating device in an embodiment of the present invention, and FIG. 5B shows the exploded drawing of the magnetism element of the FIG. 5A of the power generating device in an embodiment of the present invention. The sensor module 20 comprises a magnetism element 21 and the induction coils 226 and 246 coiled on the magnetism element 21. In the embodiment, the magnetism element 21 comprises the first sensor arm 22 and the second sensor arm 24; the extending function of the first sensor arm 22 and the extending direction of the second sensor arm 24 are vertical to the direction of the external force separately. The first sensor arm 22 comprises a first connecting portion 224, a first wrapping portion 222 and a first terminal 229. In the embodiment, the end of the first sensor arm 22 is defined as a first terminal 229. The first connecting portion 224 is connected with the first terminal 229 through the first wrapping portion 222. The first wrapping portion 222 comprises an induction coil (or named induction coil set) 226. The second sensor arm 24 comprises a second connecting portion 244, a second wrapping portion 242 and a second terminal 249. In the embodiment, the end of the second sensor arm 24 is defined as the second terminal 249. The second connecting portion 244 is connected with the second terminal 249 through the second wrapping portion 242. The second wrapping portion 242 comprises a induction coil (or named second induction coil set) 246.

Moreover, the first terminal 229 and the second terminal 249 comprises a plurality of the holes 228 and 248 separately; the extending direction of the holes 228 and 248 are vertical to the direction of the external force. In the embodiment, the size and the location of the holes 228 and 248 are corresponding to the first convex pillar 13 of the first shell 10. The first sensor arm 22 and the second sensor arm 24 is disposed in the first convex pillar 13 of the first shell 10 through the holes 228 and 248.

Otherwise, in the embodiment, the first wrapping portion 22 and the second wrapping portion 24 of the sensor module 20 are L-shaped. The first wrapping portion 22 and the second wrapping portion 24 are connected through the first connecting portion 224 and the second connecting portion 244 to be U-shaped. In the embodiment, the induction coils 226 and 246 are coiled on the first wrapping portion 222 and the second wrapping portion 242, showed in FIG. 4A, not limited to it. In the real application, the induction coils 226 and 246 are coiled on the first wrapping portion 222, the second wrapping portion 242, the first connecting portion 224 and the second connecting portion 244, showed in the FIG. 4.

Moreover, when the first sensor arm 22 and the second sensor arm 24 of the magnetism element 21 are connected with each other through the first connecting portion 224 and the second connecting portion 244, a gap is formed between the first terminal 229 and the second terminal 249. The gap is defined as a first slide gap 23 for allowing the magnetic elements of the magnetic module 30 to slide through it.

Besides, the first sensor arm 22 further comprises a first extension section 225. The first extension section 225 is formed by extending outwardly from the first terminal 229 with respect to the other direction of the first connecting portion 224. The second sensor arm 24 further comprises a second extension section 245. The second extension section 245 is formed by extending outwardly from the second terminal 249 with respect to the other direction of the second connecting portion 244. A second slide gap 25 is formed between the first extension section 225 and the second extension section 245 for the first fixture portion 33 of the second shell 30 to move through the direction of the external force. In the embodiment, the width of the second slide gap 25 is bigger than the width of the first slide gap 23, but not limited to it, in real application, the width of the slide gap is adjusted by the size of the element sliding through the slide gap.

Figure 6A:
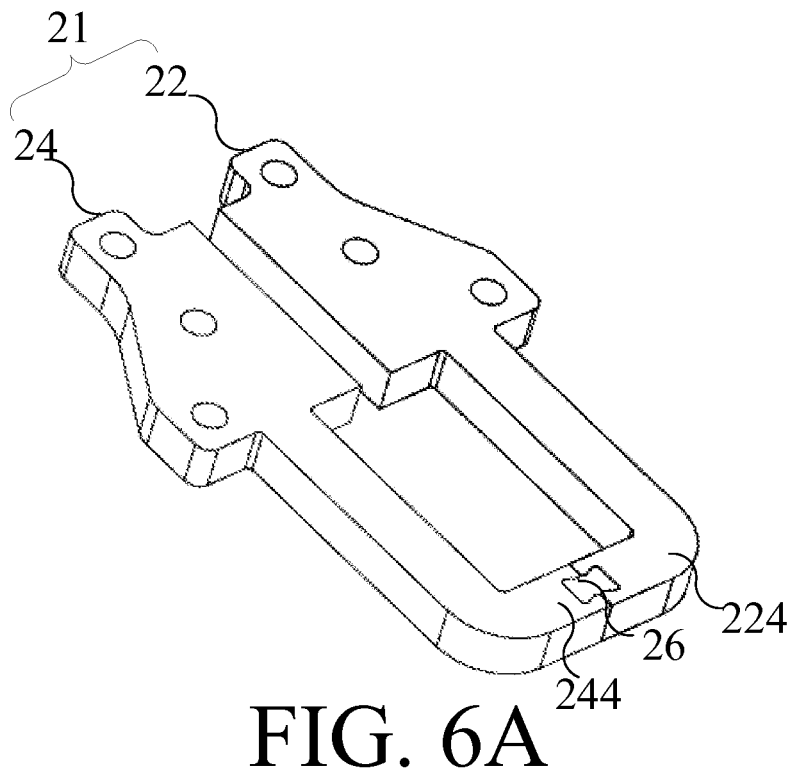
FIG. 6A shows the diagram of the magnetism element of the power generating device in an embodiment of the present invention.
Figure 6B:
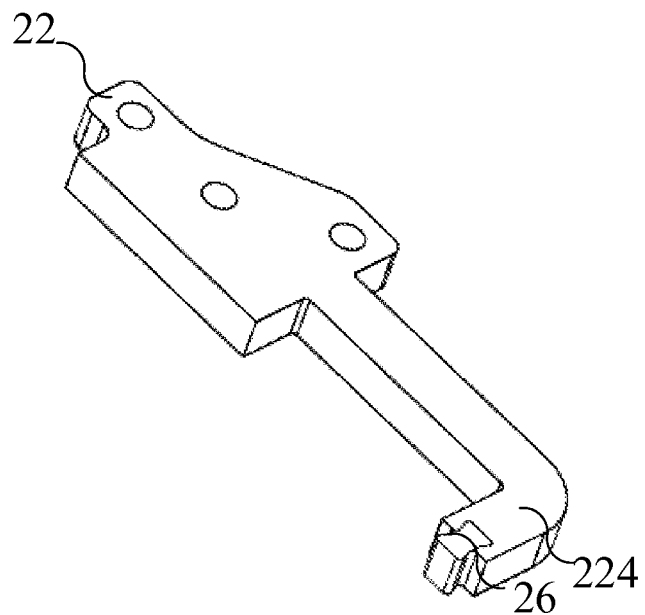
FIG. 6B shows the diagram of the magnetism element with a hidden sensor arm of the power generating device in an embodiment of the present invention.
Figure 7:
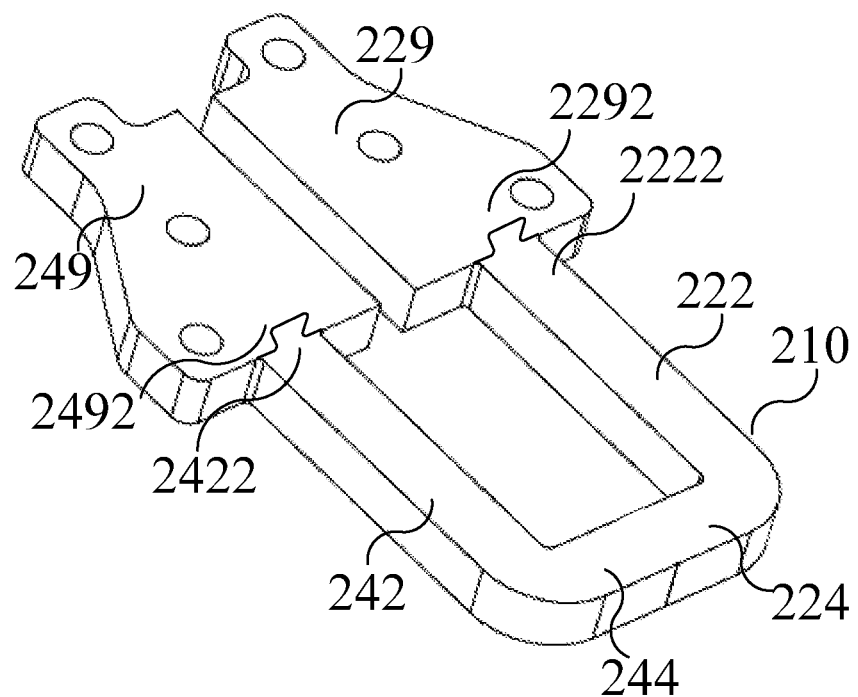
FIG. 7 shows the diagram of the magnetism element of the power generating device in an embodiment of the present invention.

Please refer to FIG. 4 to FIG. 7, FIG. 6A shows the diagram of the magnetism element of the power generating device in an embodiment of the present invention, FIG. 6B shows the diagram of the magnetism element with a hided sensor arm of the power generating device in an embodiment of the present invention, FIG. 7 shows the diagram of the magnetism element of the power generating device in an embodiment of the present invention.

In another embodiment, the present invention improves the efficiency of the coiled operation of the sensor module 20, the magnetism element 21 comprises at least two elements, showed in FIG. 4 to FIG. 7, but not limited to it, in real application, the magnetism element 21 can be one-piece formed.

In an embodiment, showed in the FIG. 5A to FIG. 5B, the magnetism element 21 comprises a first sensor arm 22 and a second sensor arm 24. The first sensor arm 22 comprises a first connecting portion 224, a first wrapping portion 222 and a first terminal 229. The first connecting portion 224 is connected with the first terminal 229 through the first wrapping portion 222. The second sensor arm 24 comprises a second connecting portion 244, a second wrapping portion 242 and a second terminal 249. In the embodiment, the first connecting portion 224 has a slot, and the slot is formed by extending inwardly from the first connecting portion 224 through the direction of the normal vector of the surface of the second connecting portion 224; the second connecting portion 224 comprises a tenon-shaped structure, and the tenon-shaped structure is formed by extending outwardly from the second connecting portion 224 through the direction of the normal vector of the surface of the first connecting portion 224. The slot of the first connecting portion 224 is corresponding to the size and the location of the tenon-shaped structure of the second connecting portion 224. The first connecting portion 224 and the second connecting portion 224 are coupled with each other through the slot and the tenon-shaped structure. The coupled direction of the slot and the tenon-shaped structure is vertical to the direction of the external force.

In the embodiment, showed in FIG. 6A and FIG. 6B, the magnetism element 21 comprises a first sensor arm 22, a second sensor arm 24 and an engaging element 26. The first sensor arm 22 comprises a first connecting portion 224, a first wrapping portion 222 and a first terminal 229. The first connecting portion 224 is connected with the first terminal 229 through the first wrapping portion 222. The second sensor arm 24 comprises a second connecting portion 244, a second wrapping portion 242 and a second terminal 249. The engaging element 26 is coupled with the first connecting portion 224 corresponding to the surface of the second connecting portion 244 and the surface of the first connecting portion 224 separately to hold the first connecting portion 224 and the second connecting portion 244. In the embodiment, the engaging element 26 comprises two tenon-shaped structure, the first connecting portion 224 has a slot corresponding to the surface of the second connecting portion 244 and the surface of the first connecting portion 224 corresponding to the second connecting portion 244. The two tenon-shaped structures of the engaging element 26 are formed by extending outwardly from the engaging element 26 through the direction of the normal vector of the surfaces of the first connecting portion 224. The first connecting portion 224 and the slot of the second connecting portion 224 are corresponding to the size and location of the two tenon-shaped structures of the engaging element 26. The engaging element 26 is disposed between the first connecting portion 224 and the second connecting portion 224. The first connecting portion 224 and the slot of the second connecting portion 224 are coupled with each other through the two tenon-shaped structures of the engaging element 26.

Most importantly, the magnetism element 21 mentioned above is divided into two pieces. In another embodiment, showed in FIG. 7, to improve the efficiency of the coiled operation of the sensor module 20, the magnetism element 21 is able to be divided into three pieces. In the embodiment, the magnetism element 21 comprises a wrapping element 210, a first terminal 229 and a second terminal 249. The wrapping element 210 comprises a first wrapping portion 222, a second wrapping portion 242, a first connecting portion 224 and a second connecting portion 244, wherein the first wrapping portion 222, the second wrapping portion 242, the first connecting portion 224 and the second connecting portion 244 are one-piece formed. The first terminal 229 is disposed on the first wrapping portion 222 corresponding to the another end of the first connecting portion 224. The second terminal 249 is disposed on the second wrapping portion 242 corresponding to the another end of the second connecting portion 244.

Besides, showed in FIG. 7, in the embodiment, the first terminal 229 comprises a third connecting portion 2292, the first wrapping portion 222 comprises a fourth connecting portion 2222, the second terminal 249 comprises a fifth connecting portion 2492, and the second wrapping portion 242 comprises a sixth connecting portion 2422. The third connecting portion 2292 is formed by extending inwardly from the first terminal 229 through the direction of the normal vector of the surface of the first wrapping portion 222. In the embodiment, the third connecting portion 2292 is a slot. The fourth connecting portion 2222 is formed by extending outwardly from the first wrapping portion 222 through the direction of normal vector of the surface of the first terminal 229. In the embodiment, the fourth connecting portion 2222 is a tenon-shaped structure. In the real application, the first terminal 229 is coupled with the first wrapping portion 222 and the fourth connecting portion 2222 through the third connecting portion 2292. Meanwhile, the fifth connecting portion 2492 is formed by extending inwardly from the second terminal 249 through the direction of the normal vector of the surface of the second wrapping portion 242. In the embodiment, the fifth connecting portion 2492 is a slot. The sixth connecting portion 2422 is formed by extending outwardly from the second wrapping portion 242 through the direction of the normal vector of the surface of the second terminal 249. In the embodiment, the sixth connecting portion 2422 is a tenon-shaped structure. In real application, the second terminal 249 is coupled with the sixth connecting portion 2422 of the second wrapping portion 242 through the fifth connecting portion 2492.

When the coiled operation is conducting, the magnetism element 21 must be divided into three pieces and recombined after the coiled operation is finished. In real applications, the total coiled turn number of the first wrapping portion 222 and the second wrapping portion 242 are between 3,000 turns and 3,500 turns, but not limited to it; the total coiled turn number is adjusted by the structure of the design or the size of the wrapping portion. The present invention improves the efficiency of the coiled operation of the sensor module 20 by dividing the magnetism element 21 to three pieces.

Figure 8A:
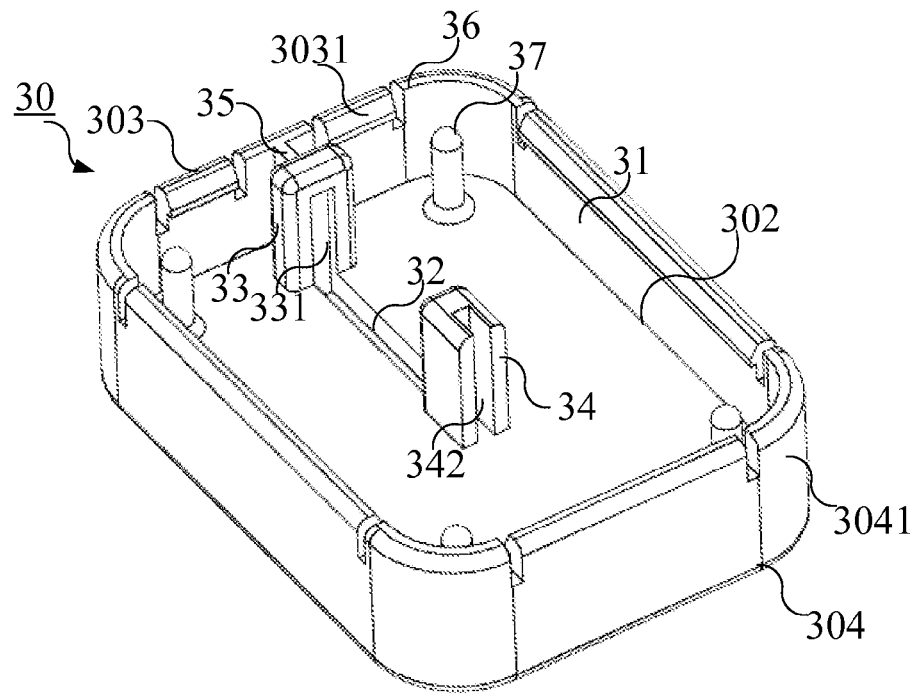
FIG. 8A and FIG. 8B show the top view diagrams of the second shell of the power generating device in an embodiment of the present invention.
Figure 8B:
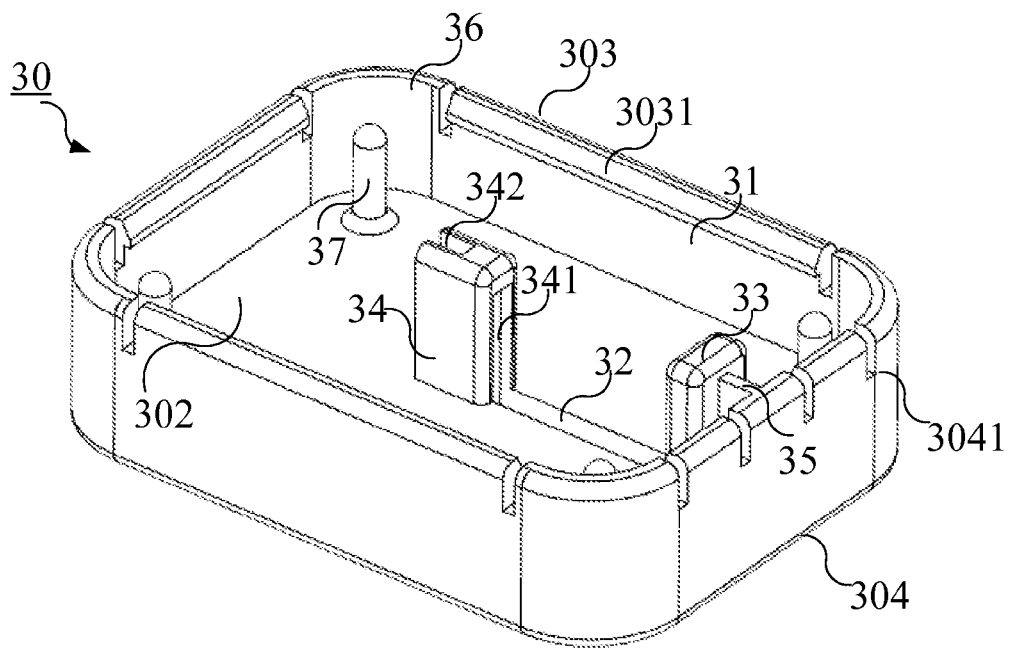
Figure 8C:
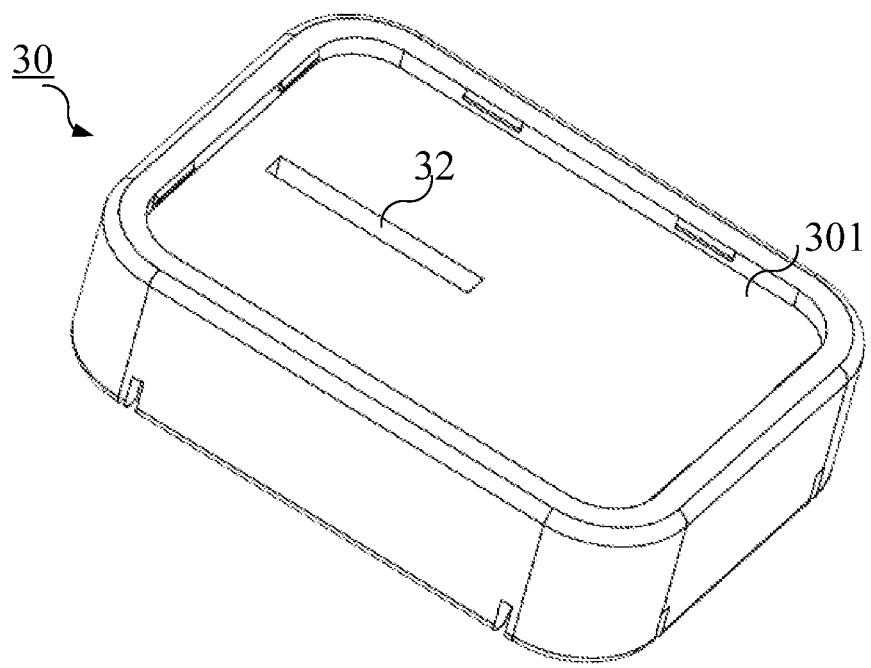
FIG. 8C shows the bottom view diagram of the second shell of the power generating device in an embodiment of the present invention.

Please refer to the FIG. 8A to FIG. 8C. FIG. 8A and FIG. 8B show the top view diagrams of the second shell of the power generating device in an embodiment of the present invention. FIG. 8C shows the bottom view diagram of the second shell of the power generating device in an embodiment of the present invention.

In the embodiment, the second shell 30 of the present invention is a square bowl structure, and the second shell 30 has the external surface 301 and the internal surface 302. The second shell 30 has a second base portion 304 and a second wall portion 3041. The second wall portion 3041 is formed by extending outwardly from the internal surface of the second base portion 304 through the direction of the normal vector of the internal surface of the second base portion 304, the second wall portion 3041 comprises a second hollow portion 31, and the second opening portion 32 is disposed on the other end of the second hollow portion 31 corresponding to the second base portion 304. Meanwhile, the second side margin 303 is disposed on the other side of the second wall portion 3041 corresponding to the second base portion 304, and the second opening portion 32 is surrounded by the second side margin 303. The second shell 30 for the first shell 10 disposed in the second hollow portion 31 through the second opening portion 36.

Besides, the second shell 30 comprises a hole 32, a first fixture portion 33, a second fixture portion 34, a supporting part 35 and at least a second convex pillar 37. The elements mentioned above are disposed in the second hollow portion 31 separately, and the first fixture portion 33, the second fixture portion 34 and second convex pillar 37 are formed by extending outwardly from the second shell 30 through the direction of the normal vector of the surface of the internal surface 302 of the second base portion 304.

The first fixture portion 33 comprises a first vertical tank 331. The first vertical tank 331 is formed by extending inwardly from the first fixture portion 33 through the direction of the surface of the second fixture portion 34. The hole 32 penetrates through the internal surface 302 and the external surface 301 of the second shell 30 and connects with the first vertical tank 331. The hole 32 for magnetic module 40 penetrating to make the magnetic module 40 be disposed in the first vertical tank 331 of the first fixture portion 33 penetrated by the hole 32.

The supporting part 35 is formed by extending outwardly from the second wall portion 3041 through the direction of the normal vector of the surface of the first fixture portion 33. Wherein, the first fixture portion 33 is connected with the second wall portion 3041 through the supporting part 35. The location of the supporting part 35 is corresponding to the location of the slot 18, and the width of the supporting part 35 is smaller than the width of the slot 18 to make the supporting part 35 get into and slide through the slot 18.

The second fixture portion 34 is connected with the first fixture portion 33 through the hole 32. The second fixture portion 34 comprises a second vertical tank 341. The second vertical tank 341 is formed by extending inwardly from the second fixture portion 34 through the direction of the normal vector of the surface of the first fixture portion 33. The second vertical tank 341 is connected with the hole 32, and two ends of the first magnetism element of the magnetic module 40 are configured in the first vertical tank 331 and the second vertical tank 341 respectively. Besides, the second fixture portion 34 further comprises a second conductor 342. The second conductor 342 is formed by extending inwardly from the second fixture portion 34 through the direction of the normal vector of another surface of the first fixture portion 33 to be a slot structure. The structure and the location of the second conductor 342 are corresponding to the first conductor 162 of the positioning structure 16 of the first shell 10 to make the tenon-shaped structure of the first conductor 162 move into the slot of the second conductor 342 for sliding.

At least one of the locations of the second convex pillar 37 is corresponding to the location hole 151, and the thickness of the second convex pillar 37 is smaller than the thickness of the elastic element 60. The design mentioned above makes the second convex pillar 37 be penetrated and set into the elastic element 60 of the location hole 151 (not shown in FIG. 8A to FIG. 8C) to hold the relative locations of the second shell 30 and the first shell 10. The said thickness means the length of the elements through the direction of the external force. The length of the elastic element is the length of the elastic element compressed totally through the direction of the external force.

Besides, the second shell 30 comprises a second wing portion 3031 corresponding to the second side margin 303. The second wing portion 3031 is formed by extending outwardly from the internal surface of the second side margin 303 through the direction of the normal vector of the internal surface of the second side margin 303. The second shell 30 and the first wing portion 1031 of the first shell 10 are buckled with each other for avoiding the first wing portion 1031 of the first shell 10 and the second shell to be taken off (not shown in FIG. 8A to FIG. 8C).

Figure 12:
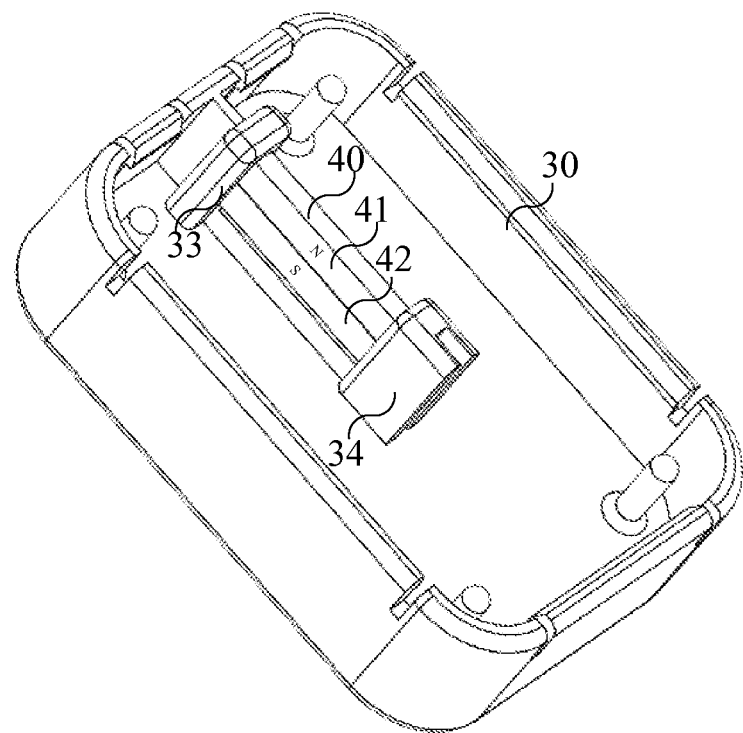
FIG. 12 shows the stereogram of the second shell, the first magnetism element and the second magnetism element of the power generating device in an embodiment of the present invention.
Figure 13:
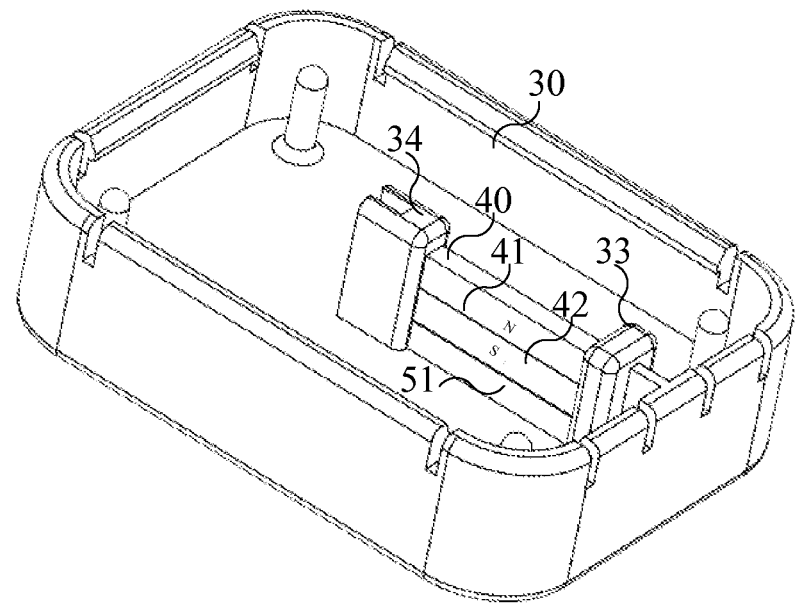
FIG. 13 shows the stereogram of the second shell, the first magnetism element and the second magnetism element of the power generating device in an embodiment of the present invention.

Please refer to the FIG. 12 and FIG. 13. FIG. 12 shows the stereogram of the second shell, the first magnetism element and the second magnetism element of the power generating device in an embodiment of the present invention. FIG. 13 shows the stereogram of the second shell, the first magnetism element and the second magnetism element of the power generating device in an embodiment of the present invention.

In the embodiment, the magnetic module 40 of the present invention comprises a first magnetism element 41 and a second magnetism element 42. The first magnetism element 41 and the second magnetism element 42 are connected to each other, and the direction of the connection is parallel with the direction of the external force. Meanwhile, as shown in FIG. 12 and FIG. 13, the polarity of the first magnetism element 41 and the second magnetism element 42 corresponding to the lateral surface of the first terminal 229 is different, and the efficiency of the power generation is improved through the efficient utilization of the electromotive force by the difference of the polarity. Besides, the material of the magnetic element of the present invention is not limited to it; for example, the first magnetism element 41 and the second magnetism element 42 can be the rubidium, the ferrous, the boron or the other appropriate material to manufacture the magnet with the high magnetic, and the element with magnetic is belonged to the present invention. Otherwise, the size of the first magnetism element 41 or the second magnetism element 42 of the present invention is 18 mm-width, 2 mm-thickness and 3 mm-height in the better embodiment, but not limited to, and the size of the magnetic element is adjusted by the different conditions in the real application.

Figure 9A:
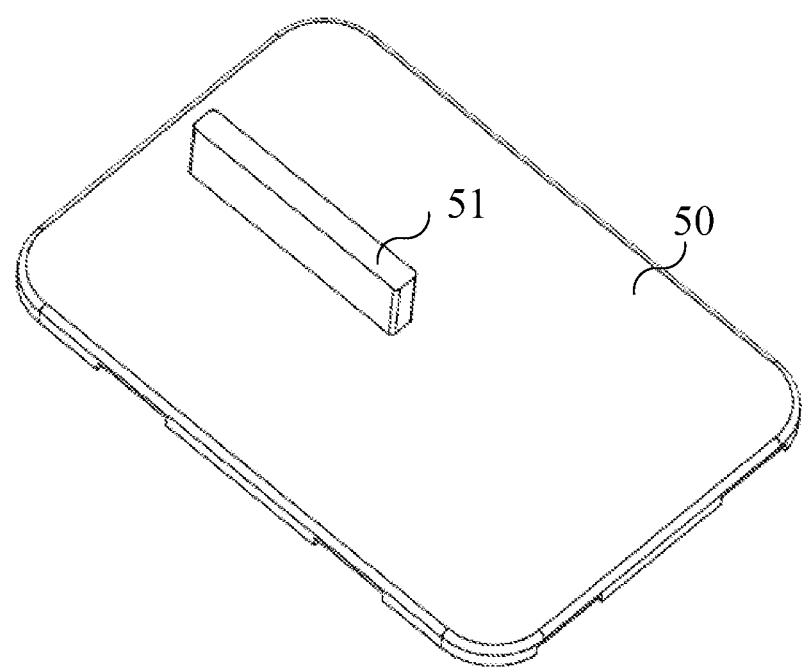
FIG. 9A shows the top view diagrams of the cover of the power generating device in an embodiment of the present invention.
Figure 9B:
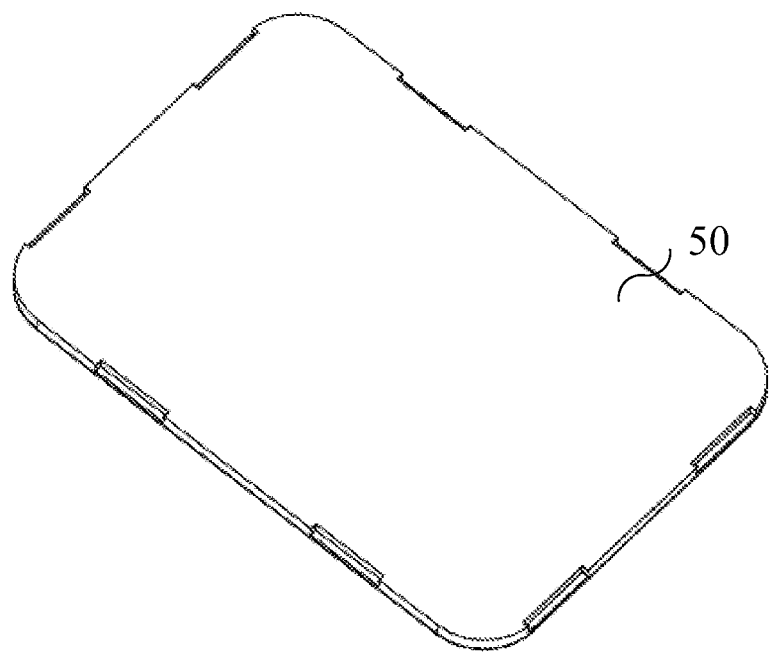
FIG. 9B shows the bottom view diagrams of the cover of the power generating device in an embodiment of the present invention.
Figure 10:
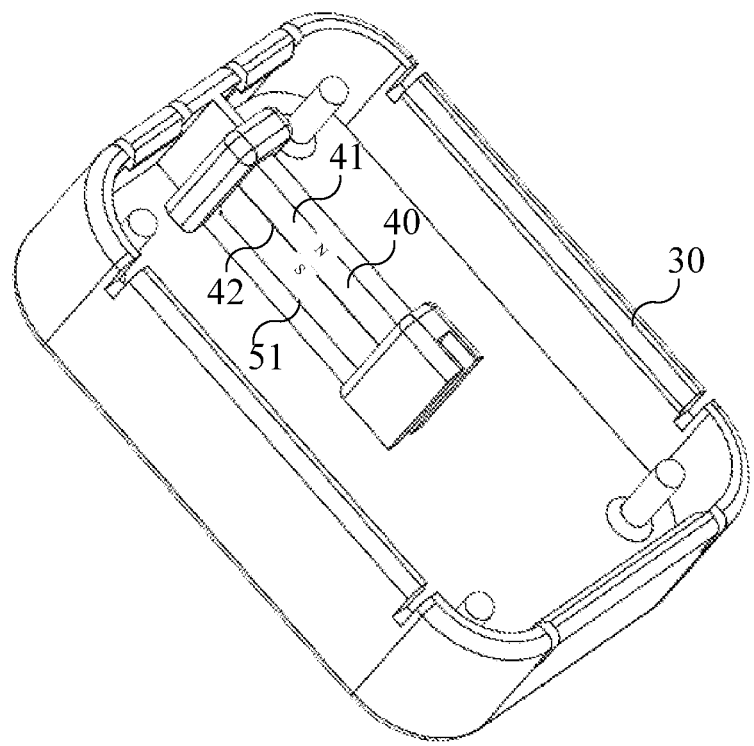
FIG. 10 shows the stereogram of the first shell, the cover and the magnetic module of the power generating device in an embodiment of the present invention.

Please refer to the FIG. 9A and FIG. 9B. FIG. 9A shows the top view diagrams of the cover of the power generating device in an embodiment of the present invention, FIG. 9B shows the bottom view diagrams of the cover of the power generating device in an embodiment of the present invention.

In the embodiment, the cover 50 of the present invention comprises a convex portion 51. The convex portion 51 is formed by extending outwardly from a surface of the cover 50 through the direction of the normal vector of the surface of the cover 50. The location of the convex portion 51 is corresponding to the location of the hole 32 of the second shell 30. The magnetic module 40 is held in the first fixture portion 33 by the convex portion 51 penetrating through the hole 32 (not shown in FIG. 9A and FIG. 9B).

Figure 11:
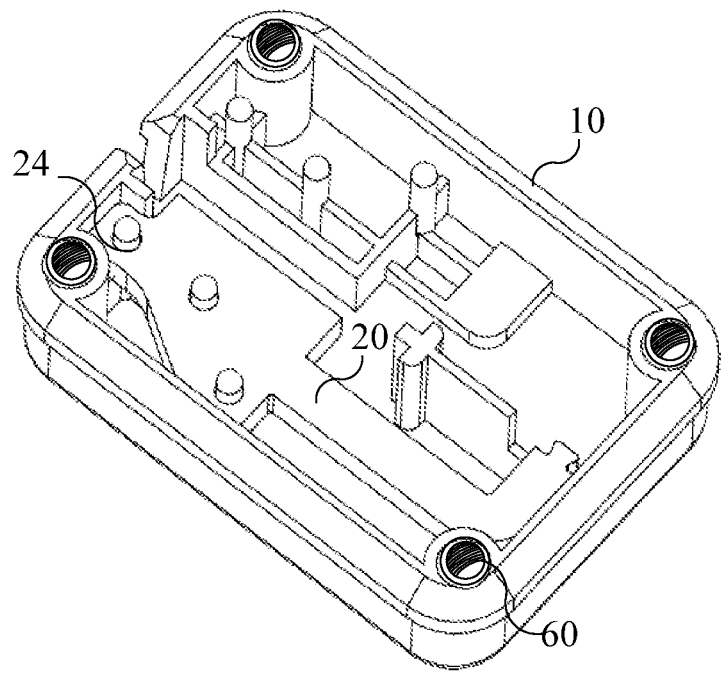
FIG. 11 shows the stereogram of the second shell, the second sensor arm and the elastic element of the power generating device in an embodiment of the present invention.

Please refer to FIG. 2A to FIG. 2B and FIG. 10 to FIG. 11 FIG. 10 shows the stereogram of the first shell, the cover and the magnetic module of the power generating device in an embodiment of the present invention. FIG. 11 shows the stereogram of the second shell, the second sensor arm and the elastic element of the power generating device in an embodiment of the present invention.

In an assemble operation, a first shell 10 is needed to be prepared. The elastic element 50 is configured in the location hole 151 of the location pillar 15 of the first shell 10. The hole 228 of the first sensor arm 22 of the sensor module 20 is disposed on the first convex pillar 13 of the first shell 10; meanwhile, the first hollow portion 11 is held at the assigned height by the first sensor arm 22 through the plummer 14 of the first shell 10. The hole 248 of the second sensor arm 24 of the sensor module 20 is disposed on the first convex pillar 13 of the first shell 10; meanwhile, the first hollow portion 11 is held at the assigned height by the second sensor arm 24 through the plummer 14 of the first shell 10. The first sensor arm 22 and the second sensor arm 24 coiled the induction coils 226 and 246 separately are connected to each other to be fixed through the first connecting portion 224 and the second connecting portion 244. Meanwhile, the sensor module 40 is held at the assigned height in the first hollow portion 11 by the first connecting portion 224 and the second connecting portion 244 configured on the stepped portion 161. The first slide gap 23 between the first sensor arm 22 and the second sensor arm 24 allows the first magnetism element 41 or the second magnetism element 42 to slide through and to be contacted directly with the first terminal 222 and the second terminal 242.

Then, a second shell 30 is prepared. The magnetic module 40 is configured between the first vertical tank 331 of the second shell 30 and the second vertical tank 341 of the second shell 30, as shown in FIG. 12. The cover 50 is covered on the external surface 201 of the second shell 20. Meanwhile, the convex portion 51 of the cover 50 penetrates through the hole 32 of the second shell 30 and the first magnetism element 41, and the second magnetism element 42 are held between the first fixture portion 33 and the second hollow portion 34, as shown in FIG. 13.

Figure 14:
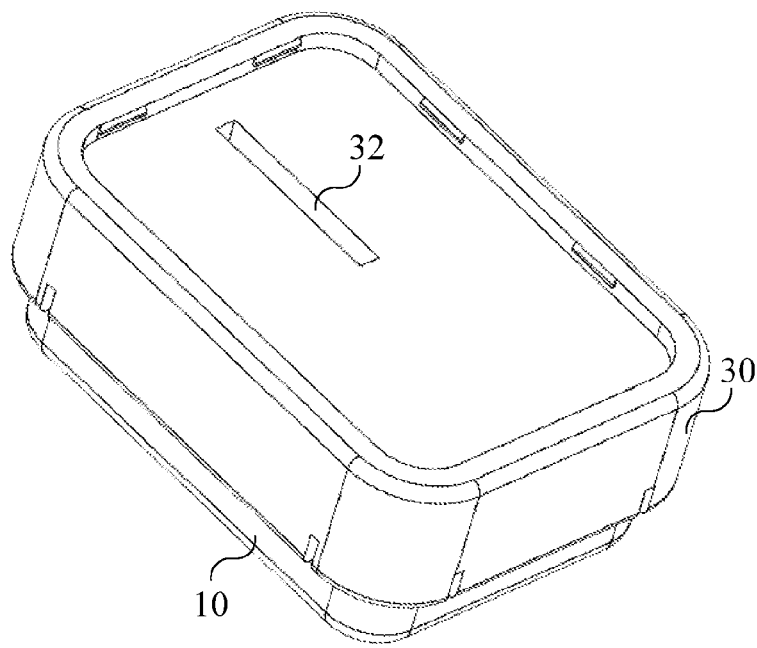
FIG. 14 shows the top view diagram of the second shell and the first shell of the power generating device in an embodiment of the present invention.

Please refer to FIG. 14. FIG. 14 shows the top view diagram of the second shell and the first shell of the power generating device in an embodiment of the present invention. The four second convex pillars 37 of the second shell 30 are line up with the four location holes 151 of the first shell 10. The second shell 30 is configured on the first shell 10. The second shell 30 is connected with the first shell 10 to be fixed through the second convex pillar 37 and the location hole 151. Meanwhile, the second shell 30 is buckled with first shell 10 through the first wing portion 1031 and the second wing portion 3031 to finish the assemble operation.

Wherein when an external force is applied to the power generating device for allowing the supporting part 35 to move into the slot 18 to make the second shell 30 and first shell 35 generate the relative movement; the firs fixture 33 of the second shell 30 moves into the second slide gap 25 to generate the relative movement; and the first conductor 162 moves into the second conductor 342 to generate the relative movement. The first magnetism element 41 and the second magnetism element 42 of the magnetic module 40 slide through the direction of the external force in the first slide gap 33 for allowing the induction coil to induct a change in magnetic flux to generate an induced current; meanwhile, the elastic element 60 is compressed with respect to the external force, and a restoring force of the elastic element is applied to the first shell 10 and the second shell 30 when the external force is vanished, wherein the direction of the restoring force and the external force is opposite.

In another aspect of the present invention, if the power generating device of the present invention is applied to shoes, the first shell 10 or the second shell 30 is compressed when the user is walking to make the first magnetism element 41 and the second magnetism element 42 work to change the polarity (the polarity of the upper magnet and the lower magnet are different), the direction of the magnetic flux of the U-shaped sensor module 40 is changed for allowing the induction coils 226 and 246 coiled on the U-shaped metal to induct a change in magnetic flux to generate positive induced voltage. The external force is applied to the first shell 10 or the second shell 30, and the spring of the elastic element 60 is compressed. When the feet of the user leave the ground, the elastic element 60 pushes the magnet of the first magnetism element 41 and the second magnetism element 42 back to the original location to change the polarity of the magnet again and generate the negative induced voltage. Meanwhile, if the power generating device 1 is connected positively with a plurality of the LED 201 of the external electronic device 2, the negative voltage generated by the power generating device 1 can be used for at least one of the LED 201 lighting when the feet of the user leave the ground, as shown in FIG. 15 FIG. 15 shows the functional diagram of the external electronic device of the power generating device in an embodiment of the present invention.

For the output polarity, the design of the present invention can generate an induced voltage with a pulse shape or a triangle wave when the present invention is applied with an external pressing force. The peak value is between 6.5 volts to 15 volts. The width of the pulse is about 16 ms to 42 ms, wherein if the width of the pulse is shorter (which means the external pressing force is larger), the generated peak value of the induced voltage is higher. When returning to its original position, an induced voltage can also be generated, wherein the width of the pulse of the induced voltage is about 88 ms and the peak value of the induced voltage is about 3 volts. Naturally, if the spring return force is larger, the width of the pulse will be shorter and the peak value will be higher.

To summarize the statements mentioned above, the power generating device of the present invention can be used in shoe pads or ground pads. When a user walks or activates the power generating device through an external force, the power generating device will use electromagnetic induction to generate an induced current, to which the induced current can be stored to supply power to the light emitting diodes in order to emit light. It should also be noted that any appropriate electronic device that is integrated in the power generating device of the present invention is potential to become a green product, as it does not need to connect to any type of outside power source or batteries. Therefore, the power generating device of the present invention can be easily installed in shoes to generate power automatically when a user performs an action such as walking. More particularly, the lighting module of the power generating device of the present invention can increase the degree of recognition at night, which also increases the traffic security of the pedestrian.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A power generating device, comprising:
   a first shell, having a first hollow portion and a first opening portion;
   a sensor module, configured in the first hollow portion of the first shell, wherein the sensor module comprises a magnetism element and an induction coil coiled on the magnetism element, the magnetism element comprises a first terminal and a second terminal and a first slide gap is formed between the first terminal and the second terminal;
   a magnetic module comprising a first magnetism element;
   a second shell, having a second hollow portion and a second opening portion, the second shell having a first fixture portion and a second fixture portion configured on the internal surface of the second shell, the magnetic module being configured between the first fixture portion and the second fixture portion; and
   an elastic element, configured between the first shell and the second shell;
   wherein when an external force is applied to the power generating device, there is relative movement between the second shell and first shell to cause the first magnetism element of the magnetic module to slide through the direction of the external force in the first slide gap to generate induced current in the induction coil and to compress the elastic element to generate a restoring force between the first shell and the second shell, wherein the directions of the restoring force and the external force are opposite.

2. The power generating device of the claim 1, wherein the magnetism element of the sensor module comprises:
   a first sensor arm, comprising a first connecting portion, a first terminal and a first wrapping portion, the first connecting portion connected with the first terminal through the first wrapping portion; and
   a second sensor arm, comprising a second connecting portion, a second terminal and a second wrapping portion, the second connecting portion connected with the second terminal through the second wrapping portion, and the second connecting portion connected with the first connecting portion.

3. The power generating device of the claim 2, wherein the first sensor arm further comprises a first extension section, the first extension section is formed by extending outwardly from the first terminal with respect to the other direction of the first connecting portion, the second sensor arm further comprises a second extension section, the second extension section is formed by extending outwardly from the second terminal with respect to the other direction of the second connecting portion, and a second slide gap is formed between the first extension section and the second extension section for the first fixture portion of the second shell to move through the direction of the external force.

4. The power generating device of claim 2, wherein the first wrapping portion and the second wrapping portion of the sensor module are L-shaped respectively, and the first wrapping portion and the second wrapping portion are U-shaped respectively when the first connecting portion is connected with the second connecting portion.

5. The power generating device of claim 1, wherein the second shell comprises a second wall portion and a supporting part, the first fixture portion is connected with the second wall portion through supporting part, the first shell further comprises a slot, wherein when the external force is applied to the power generating device, a relative movement is generated between the second shell and the first shell, and the supporting part is moved into the slot for the relative movement.

6. The power generating device of claim 1, wherein the power generating device further comprises a cover disposed above the external surface of the second shell and comprising a convex portion, and the second shell further comprises a hole and the convex portion penetrates the hole to couple the magnetic module which is configured between a first vertical tank of the first fixture portion and a second vertical tank of the second fixture portion, and two ends of the first magnetism element of the magnetic module are configured in the first vertical tank and the second vertical tank respectively.

7. The power generating device of claim 1, wherein the first shell comprises a positioning structure, the positioning structure is formed on the internal surface of the first shell, the positioning structure comprises a first conductor, the second fixture portion comprises a second conductor, wherein when the external force is applied to the power generating device, a relative movement is generated between the second shell and the first shell generate, and the first conductor is moved into the second conductor for the relative movement.

8. The power generating device of claim 1, wherein the magnetic module further comprises a second magnetism element, configured in the first vertical tank of the first fixture portion and connected with the first magnetism element, the polarity of the first magnetism element and the second magnetism element corresponding to the lateral surface of the first terminal is different.

9. The power generating device of the claim 1, wherein the first shell comprises a first wing portion, the first wing portion is formed by extending from the first shell through the direction of the normal vector of the external surface of the first opening portion, the second shell comprises a second wing portion, the second wing portion is formed by extending from the second shell through the direction of the normal vector of the internal surface of the first opening portion, and the first wing portion and the second wing portion are buckled with each other for avoiding the first shell and second shell to be broken away.

10. The power generating device of claim 1, wherein the first shell further comprises a location pillar, the location pillar comprises a location hole, the elastic element is configured in the location hole, the second shell further comprises a second convex pillar, the location of the second convex pillar is corresponding to the location hole, and the second convex pillar is penetrated and set into the elastic element, when the external force is applied to the elastic element, the thickness of the second convex pillar is smaller than the thickness of the elastic element.

11. A power generating device, comprising:
a first shell, having a first hollow portion and a first opening portion;
a sensor module, configured in the first hollow portion of the first shell, wherein the sensor module comprises a magnetism element and an induction coil coiled on the magnetism element, wherein the magnetism element comprises a first terminal and a second terminal, and a first slide gap is formed between the first terminal and the second terminal, wherein the magnetism element comprises a first sensor arm and a second sensor arm, and the first sensor arm and the second sensor arm are separable;
a second shell, having a second hollow portion and a second opening portion, the second shell having a hole;
a magnetic module comprising a first magnetism element, the magnetic module configured in the second hollow portion of the second shell;
a cover, disposed above an external surface of the second shell, the cover comprising a convex portion which penetrates the hole and couples the magnetic module; and
an elastic element, disposed between the first shell and the second shell;
wherein when an external force is applied to the power generating device, there is relative movement between the second shell and first shell to cause the first magnetism element of the magnetic module to slide through the direction of the external force in the first slide gap to generate induced current in the induction coil.

12. The power generating device of claim 11, wherein:
the first sensor arm comprises a first connecting portion, a first wrapping portion and a first terminal, the first connecting portion connected with the first terminal through the first wrapping portion; and
the second sensor arm comprises a second connecting portion, a second wrapping portion and a second terminal, the second connecting portion connected with the second terminal through the second wrapping portion.

13. The power generating device of claim 12, wherein the magnetism element further comprises an engaging element for coupling the first sensor arm and the second sensor arm.

14. The power generating device of claim 11, wherein the magnetism element comprises:
a wrapping element, comprising a first wrapping portion, a second wrapping portion, a first connecting portion and a second connecting portion, the first wrapping portion, the second wrapping portion, the first connecting portion and the second connecting portion are one-piece formed;
the first terminal, disposed on the other end of the first wrapping portion corresponding to the first connecting portion; and
the second terminal, disposed on the other end of the second wrapping portion corresponding to the second connecting portion.

15. The power generating device of claim 14, wherein the first terminal comprises a third connecting portion, the first wrapping portion comprises a fourth connecting portion, the first terminal is coupled with the fourth connecting portion of the first wrapping portion through the third connecting portion, wherein the second terminal comprises a fifth connecting portion, the second wrapping portion comprises a sixth connecting portion, the second terminal is coupled with the sixth connecting portion of the second wrapping portion through the fifth connecting portion.

16. The power generating device of claim 11, wherein the distance of the relative movement between the first magnetism element and the magnetism element is between 2 mm and 5 mm.

17. The power generating device of claim 16, wherein the first magnetism element moves in the slide gap through the direction of the external force with respect to the magnetism element for generating an induced voltage, and the induced voltage is higher than 3 volts.

18. The power generating device of claim 17, further comprising an LED, the induced voltage for the LED lighting.

19. An object for using a power generating device, wherein:
- the object having an accommodating space for holding the power generating device;
- the power generating device comprises:
- a first shell, having a first hollow portion and a first opening portion;
- a sensor module, configured in the first hollow portion of the first shell, wherein the sensor module comprises a magnetism element and an induction coil coiled on the magnetism element, wherein the magnetism element comprises a first terminal and a second terminal, and a first slide gap is formed between the first terminal and the second terminal, wherein the magnetism element comprises 32 a first sensor arm and a second sensor arm, and the first sensor arm and second sensor arm are separable;
- a second shell having a second hollow portion and a second opening portion;
- a magnetic module comprising a first magnetism element, the magnetic module configured in the second hollow portion of the second shell;
- wherein when an external force is applied to the power generating device, a distance of the relative movement between the first magnetism element and the magnetism element is between 2 mm and 5 mm, and the first magnetism element moves in the slide gap through the direction of the external force with respect to the magnetism element for generating an induced voltage which is higher than 3 volts.

20. The object of claim 19, wherein the object is a shoe, and the accommodating space is located at the shoe heel.

* * * * *